Sept. 24, 1957 J. G. COUSER 2,807,373
AUTOMATIC HANDLING DEVICES
Filed March 28, 1955 4 Sheets-Sheet 1

INVENTOR.
JAMES G. COUSER.
BY
ATTORNEY

Sept. 24, 1957 J. G. COUSER 2,807,373
AUTOMATIC HANDLING DEVICES
Filed March 28, 1955 4 Sheets-Sheet 3
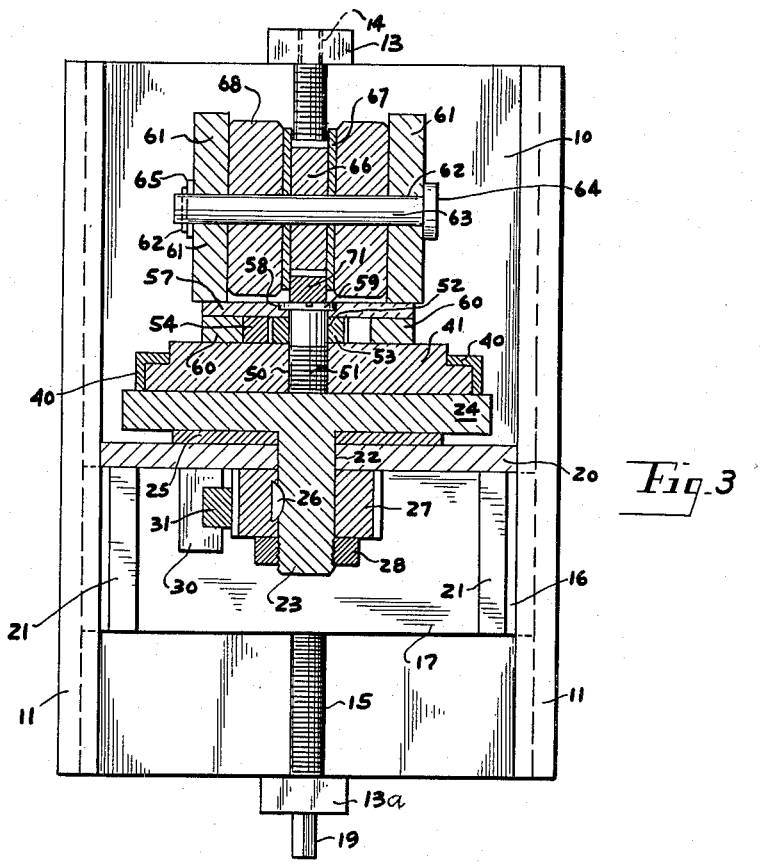
Fig. 3
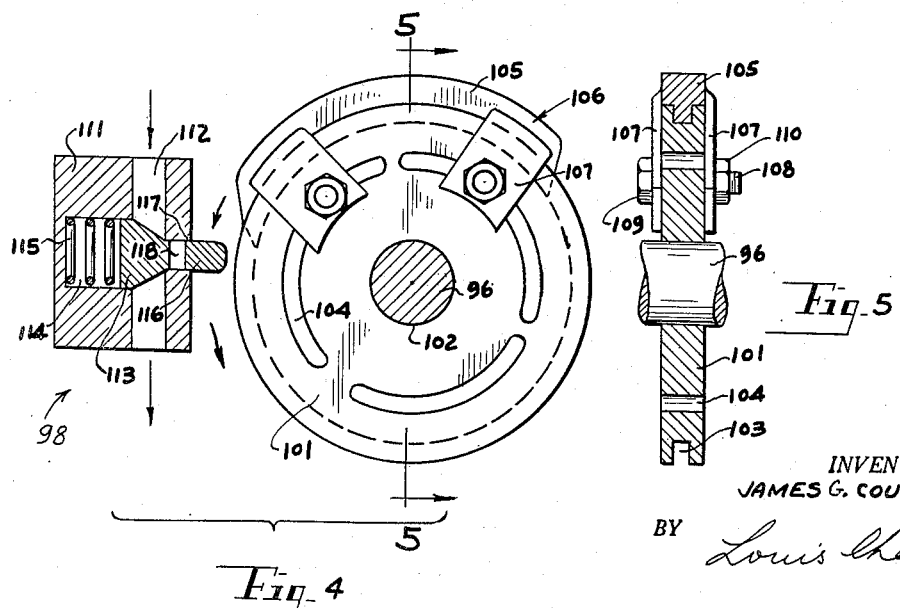
Fig. 4
Fig. 5
INVENTOR.
JAMES G. COUSER
BY Louis Chayka
ATTORNEY.

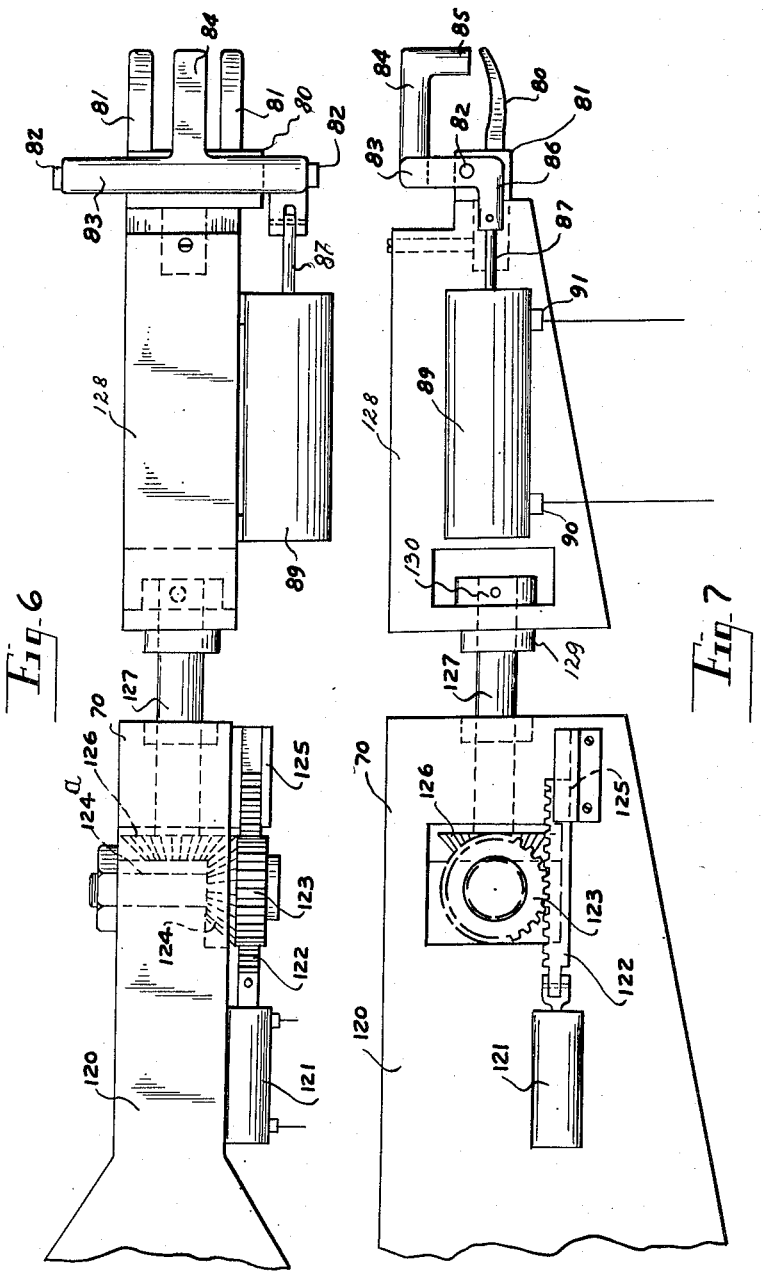

United States Patent Office 2,807,373
Patented Sept. 24, 1957

2,807,373

AUTOMATIC HANDLING DEVICES

James G. Couser, Detroit, Mich.

Application March 28, 1955, Serial No. 497,166

2 Claims. (Cl. 212—42)

The invention pertains to an apparatus adapted for use with machines designed to perform consecutively a number of operations on the same object. Normally, an object on which one operation has been performed by one machine had to be removed manually and transferred, also manually, to another machine and positioned there for another operation, then possibly transferred to another machine or machines until all the operations called for in the manufacture or treatment of the object have been concluded.

The purpose of the invention is to provide a mechanism which will automatically remove a given object from one machine to another machine or machines for consecutive operations thereon.

I shall describe the apparatus with reference to the accompanying drawings in which:

Fig. 3 is a sectional view on line 3—3 of Fig. 1;

Fig. 4 is a side elevational view of a cam-carrying element included in the apparatus and a sectional view of a valve operated thereby;

Fig. 5 is an enlarged vertical sectional view on line 5—5 of Fig. 4;

Fig. 6 is an enlarged top elevational view of a modified element included in the apparatus;

Fig. 7 is a side elevational view of said element.

Similar numerals refer to similar parts throughout the several views.

Figure 2:
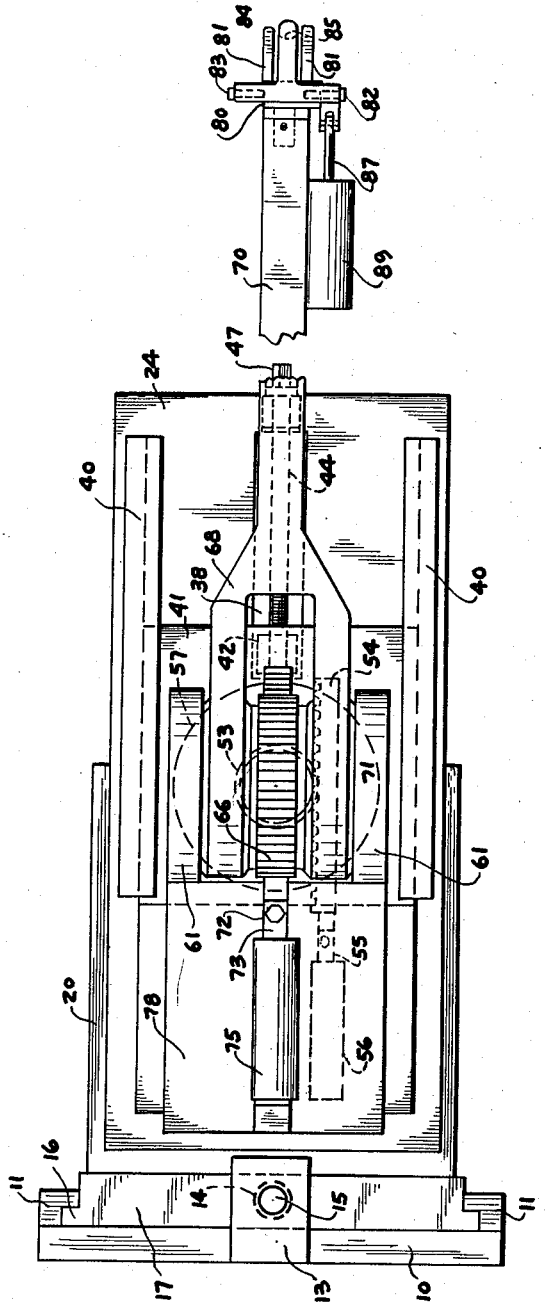
Fig. 2 is a top elevational view of the apparatus.

The apparatus includes a vertical mounting plate 10 which is secured to a suitable supporting structure, such as a wall of a building or suitable standards. Disposed along the vertical sides of the plate are two gibs 11, one on each side of the plate, the gibs facing each other, as best shown in Fig. 2. Secured to the top of the plate 10, by being welded thereto or by other means, and disposed centrally thereon is a block 13. A similar block 13a extends from the lower end of the plate, the blocks being vertically aligned.

Each of them contains a bearing 14, and journalled in said bearings, at its opposite ends, is a threaded shaft or screw 15. Disposed between the gibs 11 and engaged therewith by means of lateral flanges 16 for a vertical sliding movement is a plate-like member 17 which is provided with a threaded vertical aperture 18 for reception and engagement of the screw 15. The screw, at its lower end, terminates with an angular stud 19 for application of a wrench or a crank whereby the screw may be turned about its axis.

Extending from the top of said member 17 is a horizontal shelf 20 which is braced from below by a pair of spaced triangular plates 21. The shelf contains a circular aperture 22, and journalled for rotation therein is a vertical shaft 23 which at its upper end is integrally connected to a rectangular platform 24, the latter resting on a washer-like member 25. Secured to the shaft by means of a key 26 is a gear wheel 27 which is kept in place against axial dislocation by means of a nut 28. A single gib 30, secured to the underside of said shelf 20 and disposed at right angle to the mounting plate 10, forms a slideway for a rack 31 which is in mesh with said gear wheel 27.

Figure 1:
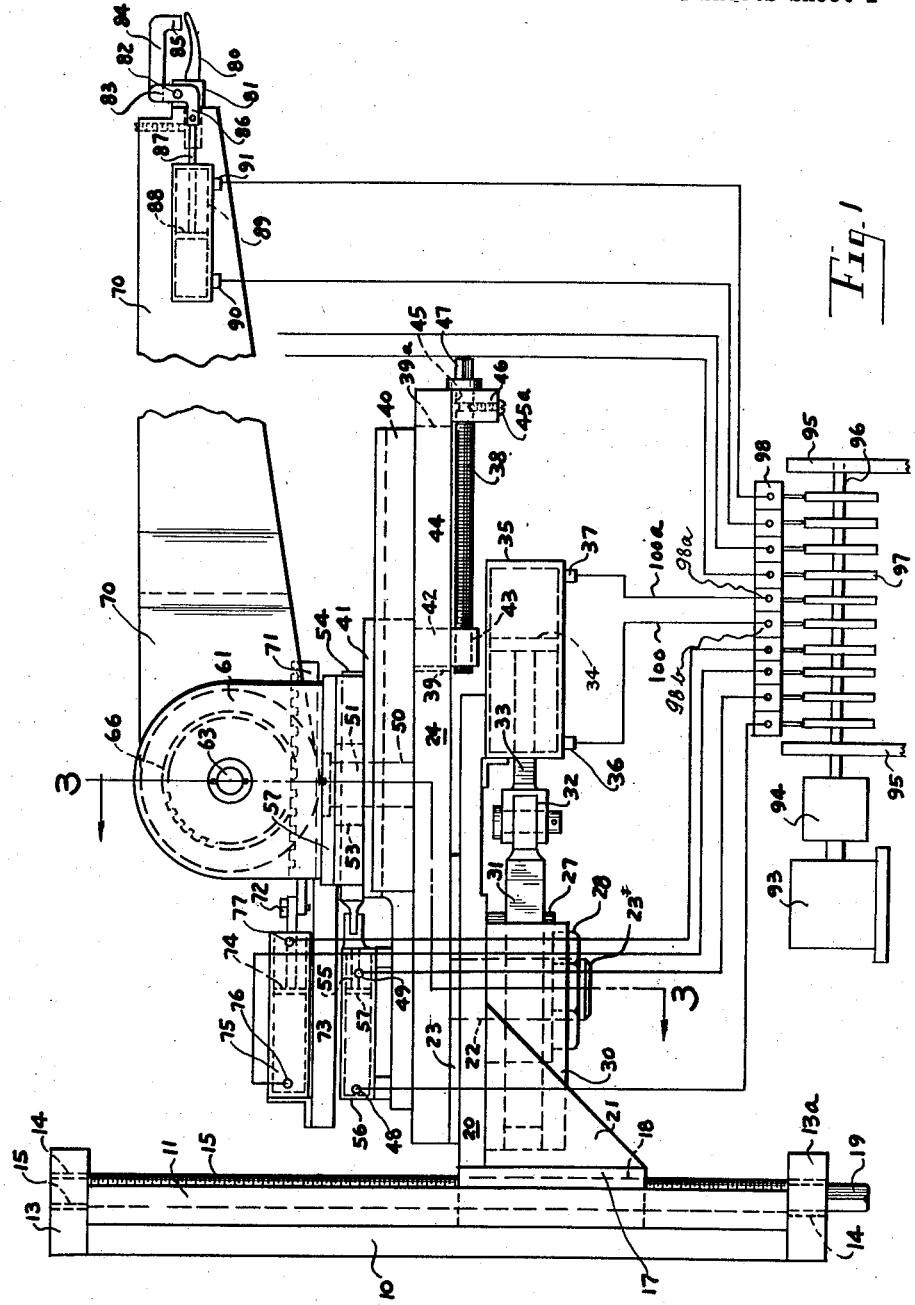
Fig. 1 is a side elevational view of the apparatus, the view including also a number of elements presented diagrammatically.

One end of the rack, specifically, the end remote from plate 10, is connected, as shown at 32 in Fig. 1, to one end of a rod 33 which at the opposite end is secured to a piston 34. The piston, adapted to move back and forth, is located within a cylinder 35. The latter is attached, in a horizontal position, to the underside of said shelf 20 and is provided with two ports, 36 and 37, each serving, interchangeably, as an inlet port and an outlet port for admission to or release from the cylinder of a fluid medium under pressure, such as air or liquid. The fluid medium is employed for the operation of the piston within said cylinder. The lines leading to the ports represent diagrammatically tubes by means of which said fluid medium is conveyed to or from the cylinder.

The platform 24 contains a slot 38, the slot running parallel to the sides of the platform, midway its width, from a line 39 to line 39a, as shown in Fig. 1. On its upper surface said platform carries two L-shaped gibs 40, one gib extending along one side of the platform, the other gib along the other side thereof, and disposed for a sliding movement therebetween is a table 41.

Extending from one end of the table 41 downwardly through said slot 38 is a bar 42 which at its lower end contains a threaded hole 43 for engagement with a propelling screw 44 disposed under the slot 38 in a parallel relation thereto. The outer end of the screw is located in a smooth bore 45 in a block 46 which is connected to the end portion of the platform 24 on its underside. The screw is adapted to be rotated about its axis by means of an angular stud 47. To prevent a longitudinal movement of the screw, said screw is provided with an annular groove 44a, and fitting into the groove is a screw 45a threaded through said block 46.

The table 41 contains a threaded hole 50, and threaded into it is a stub axle 51 which passes through an axial aperture 52 in a pinion 53. The latter is in mesh with a horizontally-disposed rack 54 which at one end, extending towards the mounting plate 10, is connected to a rod 55. At its other end, the rod is joined to a piston 57a in a cylinder 56. Two ports, 48 and 49, within the wall of the cylinder are connected to tubes by means of which fluid medium, under pressure, may be admitted to the cylinder for the operation of the piston in the manner described with reference to cylinder 35.

The cylinder 56 is mounted at one end of said table 41, the surface of which, at this end, dips below that of the rest of the table.

Resting on said pinion 53 and designed for rotation therewith is a disk-shaped turntable 57 which, at its center, contains a shallow socket 58 for reception of the head 59 of a stub axle 51. The marginal portion of the turntable rests on stationary bars 60, one of which serves as a backing for said rack 54.

Welded to the turntable 57 and rising therefrom is a pair of spaced standards 61, the standards being in a spaced relation to each other, as best shown in Fig. 3. Each standard is provided with a horizontal bearing 62, and fitting into said bearings, at its ends, is a shaft 63 which, at one end, includes a head 64, while the other end, being threaded, carries a nut 65.

Mounted upon the shaft, for rotation thereon, is a gear wheel 66, the wheel being flanked on each side by a washer-like member 67, and straddling said members 67 and the gear wheel is a forked end 68 of a crane 70. The gear wheel and said forked member 68 are keyed to the shaft in order that the crane may be swung in an arc in a vertical plane by means of said gear wheel 66.

For that purpose I employ a rack 71 which is disposed under said wheel, one end of the rack being connected to a rod 73, as shown at 72. The rod, at its opposite end, is joined to a piston 74 in a cylinder 75. The latter is also provided with two ports, 76 and 77, in the manner of ports 36 and 37 in cylinder 35. The cylinder is located on a platform 78 which at one end is connected to standards 61.

Secured to the outer end of the crane is a transverse bar 80, and extending therefrom, at right angle thereto, is a pair of spaced fingers 81, as shown in Figs 1 and 2. Pivotally connected to the bar by means of a pin 82 is a bell crank 83 which carries a claw 84. The outer end 85 of the claw is turned downwardly towards the free space between the fingers, as shown in Fig. 2. The opposite end 86 of the bell crank is connected to one end of a rod 87 which, at the other end, is secured axially to a piston 88 in a cylinder 89. The cylinder, which is mounted on one side of the crane, as shown in Fig. 2, is provided with two ports 90 and 91 which are similar in purpose and structure to ports 36 and 37 in cylinder 35.

As already stated herein, each of the cylinders is equipped with two ports through which a fluid medium, under pressure, may be conveyed to or from the respective cylinders. As in each cylinder the fluid is to operate a piston which, in turn, is to actuate a rack to cause a certain specific function, and as these functions are to follow in a certain order, the delivery of the fluid to a cylinder or withdrawal thereof from said cylinder is effected in a sequence.

For that purpose, I am using a series of valves, one for each tube leading to a respective port in each cylinder. The valves, in turn, are operated, with the air of motor means, by individual controls responsive to the impulses transmitted by said motor means. Furthermore, since the interval between one operation and another in a series of such operations may vary, I have provided means to automatically take care of such intervals.

The drawings with respect to the structure of the valves and the controls therefor are partly diagrammatic, as there is no invention in the structure of said valves or the tubes through which the liquid medium is conveyed to or from said cylinders.

Attention is now invited to Fig. 1, where numeral 93 indicates a motor, numeral 94 identifies a reduction gear mechanism, and numeral 95 indicates two standards containing bearings, not shown, for support of a shaft 96 which carries a number of cam-carrying disks 97. The cams are designed to engage individual valves 98. Individual tubes to which the valves are applied are shown by single lines. Two such lines, 100 and 100a, lead to the cylinder 35, line 100 being connected to port 36 and tube 100a being connected to the port 37.

A single cam-carrying disk is shown in Fig. 4. The disk, marked 101, has an axial aperture 102 in order that it may be mounted upon a shaft 96 and keyed thereto, and is provided with a groove 103 in the peripheral portion thereof. In addition thereto, the disk is provided with a plurality of arcuate slots 104, the slots together defining a circle having the same center as said disk. Fitting over the outer periphery of the disk and partly fitting into said groove 103 is an arcuate cam 105. The cam is kept in place by two pairs of clamps, generally identified by numeral 106. Each includes two plates 107 applied to the disk from opposite sides and a bolt 108 including a head 109. The bolt passes through an opening in each plate and through one of the slots 104. A nut 110 serves to fasten the plates 107 in a tight frictional contact with the sides of the disk to prevent dislocation or loosening thereof. It will be understood that the position of the cam on the disk may be shifted in either direction, that is, clockwise or reversely thereto.

The valve included in Fig. 4 comprises a body portion 111 having therein a passage 112 which is normally blocked by a pin 113. One end of the pin fits into a socket 114 in said body portion 111 and bears against a coiled spring 115 contained therein. The other end 116 of the pin, which is of a reduced diameter, passes through an aperture 117 leading from the passage to the outer surface of said body portion 111 and projects therefrom towards the disk 101. The portion of the pin which is normally disposed within said aperture 117 contains a duct 118 in a parallel relation to said passage 112, the duct being normally out of alinement with said passage and kept so by the tension of the spring 115. To put the duct into alinement with said pressure, the pin has to be depressed in the direction of the socket 114.

This is effected by means of the cam 105 shown in Fig. 4. The arrow between the valve and the disk 101 shows the direction of rotation of the disk and the path of travel of the cam 105, during which travel the cam will depress the pin, thus opening the valve for passage of liquid or air from one end of the valve through the duct 118 in the pin to the other end of the valve.

The drawing in Fig. 6 shows the operative end of a crane 120 which is analogous to crane 70. Here, however, the crane is supplemented by an extension capable of a rotary movement about the axis of the crane.

For that purpose, another cylinder 121, mounted on the crane, is used to operate a rack 122 by means of a piston which is within the cylinder. The rack drives a gear wheel 123 which is axially mounted on a chaft 124a which carries a bevel gear 124. A gib 125, also secured to the crane 120 at the end thereof, guides the rack in its movement. The bevel gear 124 is in mesh with a complementary bevel gear 126 which, by being keyed to a shaft 127, is adapted to turn said shaft about its axis.

Mounted upon the last-named shaft is a short beam 128 which, at its rear end, contains a cylindrical collar 129 fitting over the end of shaft 127, and is secured to said shaft by means of one or more set-screws 130. In this case it is this beam which carries a pneumatic cylinder for the operation of the grasping mechanism at the end of the crane, the mechanism consisting of two stationary fingers 80 and a pivoted claw 84. As the mechanism is identical with that shown in Fig. 2, the component elements thereof are identified by the same numerals by which they are identified in Fig. 2.

As already indicated, the apparatus is capable of performing a number of automatic functions in time sequence. As the functions have to be timed, it is the cam-bearing disks shown in Fig. 4, or cam disks as they will be called, which are employed to carry out this arrangement.

The disks, as stated above, are mounted on a shaft 96 and are rotated in unison by motor means. Each of the disks is operatively engaged with a valve such as shown in Fig. 4 where said valve is identified generally by numeral 98.

It will be assumed that the apparatus is in the right position with respect to a given machine which it is to serve, and that the operative elements of the apparatus have been brought to the right level by means of the screw 15 best shown in Fig. 1. Assuming now that the disks have been set rotating, the cam 105 on each disk will, in the course of its rotation, depress pin 117 in the respective valve so that during the time of contact of the cam the valve will be open. The position of the cam on the disk may be adjusted with respect to the positions of cams on other disks in order that one valve in the series of valves may be open while, for instance, the next valve will be closed, or in order that the valves may be opened, one by one, in time sequence even though they may not be located in a corresponding sequence in the arrangement shown in Fig. 1.

To give here an illustration of the working of the valves, reference will be had to Figs. 1 and 4. It will be assumed that in the course of its rotation one of the disks will open valve 98a. The valve being open, compressed air will be admitted through said valve to cylinder 35 through port 37. Responsive to the pressure of air, piston 34 will move rack 33 and turn the gear wheel 27. As a result, shelf 24, with all the superstructure, including crane 70, will swing in a horizontal position towards the machine or away from it, as the case may be.

After a lapse of time, the adjoining cam disk will open another valve, 98b, in order that compressed air passing through said valve to port 36 may push the piston in the opposite direction, thus returning the crane to its original position while the air in that portion of the cylinder which contains port 37 would be released. Provisions to that end are well known, and partly for that reason and partly for the reason of clarity of the drawings, they have been omitted from said drawings.

It will be understood that all other pneumatic cylinders shown in the drawings are operated in the same manner and that the pistons in said cylinders which actuate racks are moved by compressed air which is delivered to the respective cylinders by separate valves operated by said cam disks. It is in this manner that a rotary movement is imparted to the turntable 57 and that the crane 70 may be raised or lowered by means of rack 71 operated by piston 74 in cylinder 75.

The mechanism shown at the end of crane 70 in Figs. 1 and 2, for the purpose of grasping an object and including two stationary fingers 80 and a pivoted claw 84, is operated by a rod 87 from a cylinder 89. Compressed air is delivered to the cylinder by pipes through a pair of valves 98 controlled by respective cam disks 97. An impulse by means of the rod in one direction will cause the claw to swing away from the fingers, while an impulse in the opposite direction will cause the claw to swing towards the fingers so that an object may be grasped and held between said fingers and said claw.

The structure shown in Figs. 6 and 7 will be of benefit in cases where, because of obstructions, the operative end of the crane cannot be lowered into an operative action but may be brought into its operative engagement laterally. It is for this purpose that the beam 128 may be turned at right angle from its position shown in Fig. 6 to the position shown in Fig. 7. The turning may be effected again by a rack 122 actuated by a piston in a cylinder 121 to which air is delivered under pressure in the manner already described with reference to other cylinders of the apparatus.

After having described said apparatus, what I wish to claim is as follows:

1. In an apparatus adapted to transfer an object from one location in a machine to another, a horizontal shelf, screw means to adjust the position of the shelf vertically, a table mounted upon said shelf by means of a vertical shaft and adapted to be turned about the axis thereof, a sliding platform upon said table, means to shift the platform upon said table, a turn-table supported upon said platform, the turn-table being adapted to be rotated about its axis, a pair of standards upon the turn-table, a crane at one end pivotally supported within said standards and adapted to be swung up and down from its pivotal connection, the other end of the crane including a grasping mechanism composed of stationary finger means and pivotally mounted claw means adapted to co-operate with the finger means, and a system employing a fluid medium under pressure to perform the functions of rotating the table and the turn-table, swinging the crane vertically, and operating the grasping mechanism, the system including separate valve means for each of said functions, and power-operated means to operate the valves in time sequence.

2. In an apparatus adapted to transfer an object from one location in a machine to another, a horizontal shelf, screw means to adjust the position of the shelf vertically, a table mounted upon said shelf, rack and gear-wheel means to rotate the table about a vertical axis, a sliding platform upon said table, screw means to move the platform in a straight line movement upon said platform, rack and pinion means to rotate the turntable, standard means on the turntable, a crane at one end pivotally supported by said standard means, rack and gear-wheel means to swing the crane from its pivotal connection in a vertical plane, and a grasping mechanism at the outer end of the crane, the mechanism including stationary finger means and pivoted claw means and a bell crank to actuate the claw means for a reciprocal operative movement with respect to the finger means, and a system employing a fluid medium under pressure to operate said bell crank and each of the racks, the system including, for said bell crank and for each rack, a separate cylinder with a reciprocating piston therein, pipe means to deliver the fluid medium to the cylinder, valve means in said pipe means, and power-driven control means to operate the valves in time sequence.

References Cited in the file of this patent

UNITED STATES PATENTS

| | | |
|---|---|---|
| 2,216,318 | Lewis | Oct. 1, 1940 |
| 2,599,991 | Hegre | June 10, 1952 |
| 2,639,023 | Goodrich | May 19, 1953 |
| 2,699,697 | Kelso | Jan. 18, 1955 |